No. 761,945. PATENTED JUNE 7, 1904.
N. K. CHERRILL.
PHOTOGRAPHIC PRINTING FRAME.
APPLICATION FILED JAN. 6, 1904.
NO MODEL. 3 SHEETS—SHEET 1.

Witnesses:
W. P. Blee
L. W. Irving

Inventor
Nelson King Cherrill
by his attorney
James Hamilton

No. 761,945. PATENTED JUNE 7, 1904.
N. K. CHERRILL.
PHOTOGRAPHIC PRINTING FRAME.
APPLICATION FILED JAN. 6, 1904.
NO MODEL. 3 SHEETS—SHEET 2.
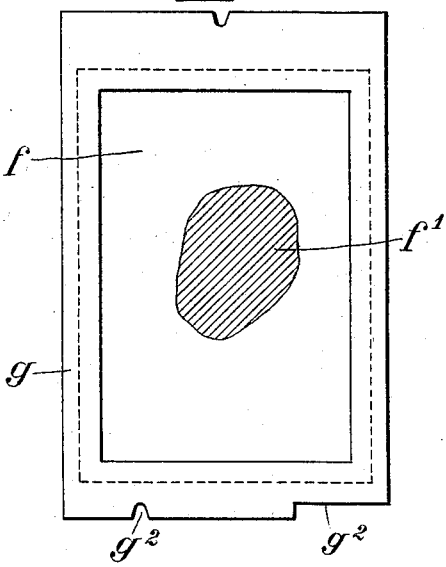
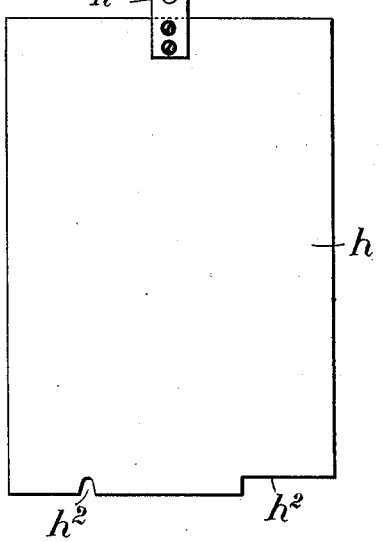
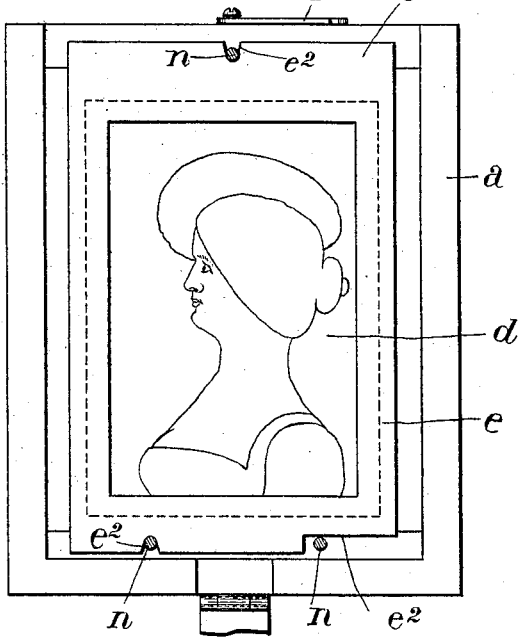
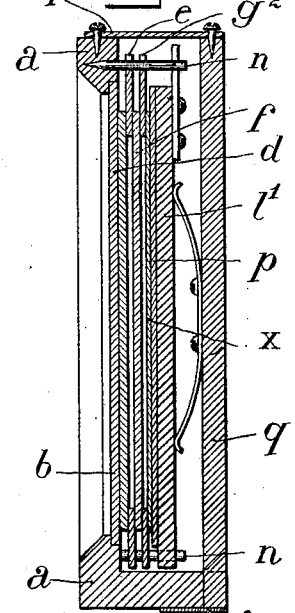

No. 761,945. PATENTED JUNE 7, 1904.
N. K. CHERRILL.
PHOTOGRAPHIC PRINTING FRAME.
APPLICATION FILED JAN. 6, 1904.
NO MODEL. 3 SHEETS—SHEET 3.
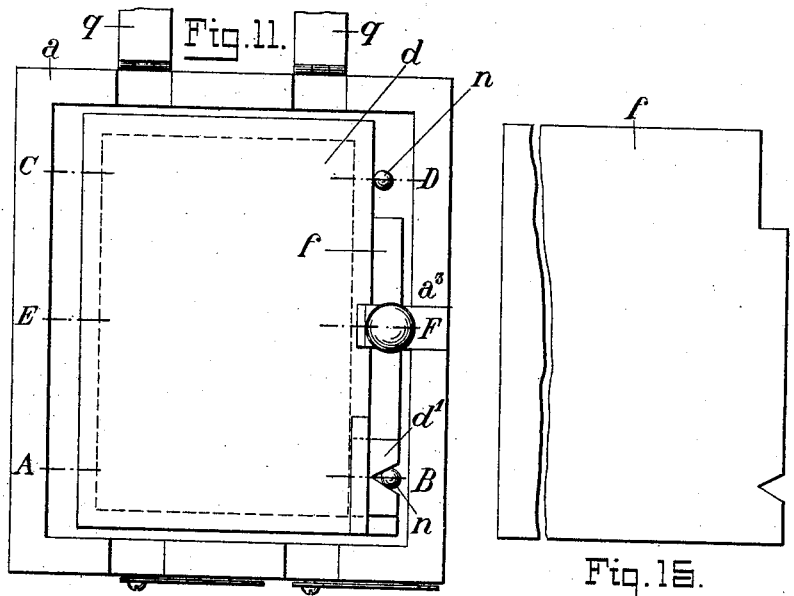
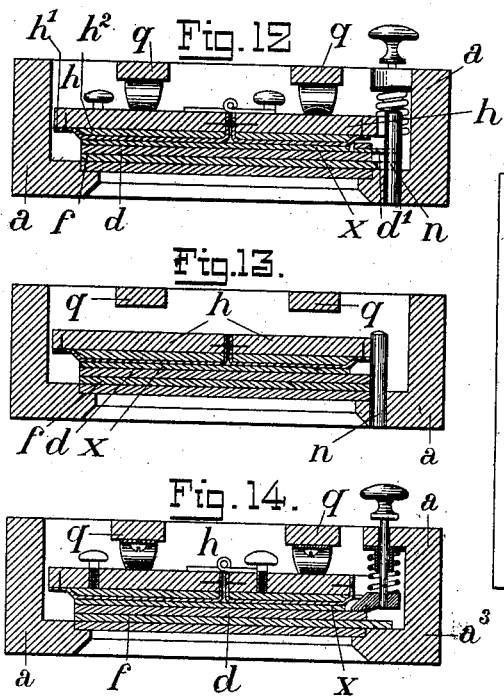

No. 761,945. Patented June 7, 1904.

UNITED STATES PATENT OFFICE.

NELSON KING CHERRILL, OF LAUSANNE, SWITZERLAND.

PHOTOGRAPHIC-PRINTING FRAME.

SPECIFICATION forming part of Letters Patent No. 761,945, dated June 7, 1904.

Application filed January 6, 1904. Serial No. 187,881. (No model.)

*To all whom it may concern:*

Be it known that I, NELSON KING CHERRILL, gentleman, a subject of the King of Great Britain and Ireland, and a resident of Fleur d'Orient, Avenue de Rumine, Lausanne, Switzerland, have invented certain new and useful Improvements in and Relating to Photographic-Printing Frames, of which the following is a specification.

This invention comprises a photographic-printing frame which is provided with means of inspecting the entire surface of the print at any time during its production. The frame is also provided with means of removing the negative for inspection during the printing operation and of replacing the same in perfect register with the print, and the frame is also provided with means of placing certain masks either on the front or on the back of the negative in such a manner as to weaken or strengthen certain parts of the impression or to improve the same by producing other effects upon it, and means are provided to allow such masks to also be placed in perfect register with the negative and with the print in course of the printing operation.

The accompanying drawings, which make part of this specification, show by way of example several ways of carrying out this invention. In these drawings the thicknesses are exaggerated with the intention of making the meaning more clear.

Figure 10:
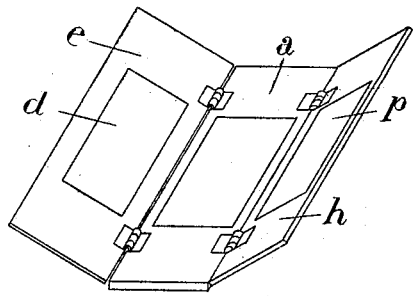
Figure 5:
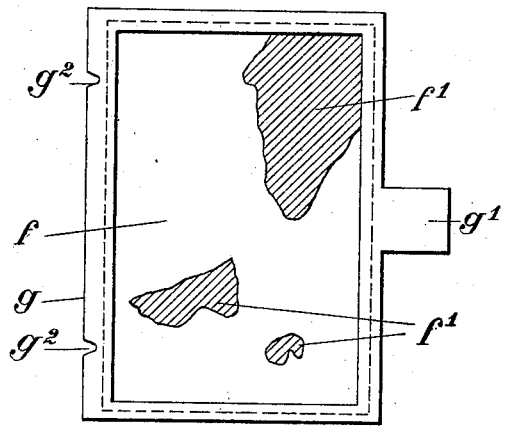
Figure 1:
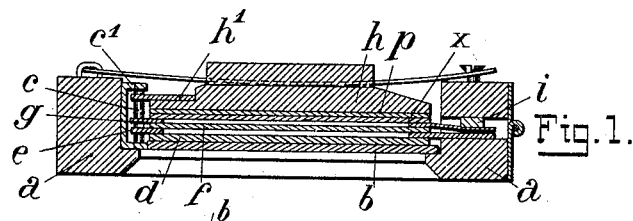
Figure 3:
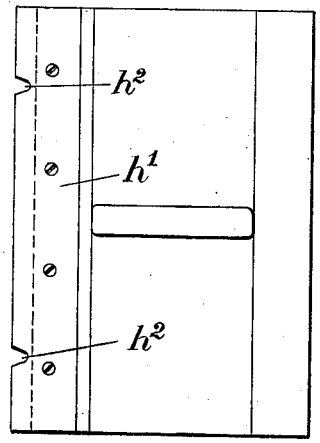

Figure 1 shows a transverse section of a printing-frame closed. The various parts of this frame are shown open in Figs. 2, 3, 4, and 5. Fig. 6 shows a longitudinal section of a printing-frame closed, of which the various parts are represented open in Figs. 7, 8, and 9. Fig. 10 shows in perspective view another construction. Figs. 11 and 15 show another form of construction. Fig. 11 shows the frame open and seen from the back. Fig. 12 is a section of the frame shown in Fig. 11, on the line A B. Fig. 13 is a section of the same on the line C D. Fig. 14 is a section of the same on the line E F. Fig. 15 represents a mask corresponding to this frame. Fig. 16 represents a back, also corresponding to the same frame.

Figure 4:
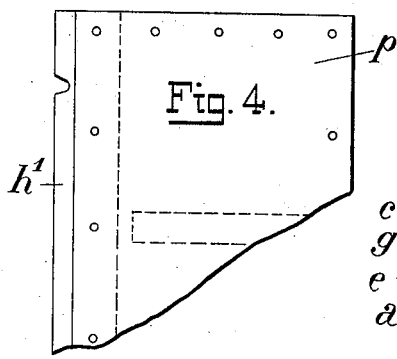
Figure 2:
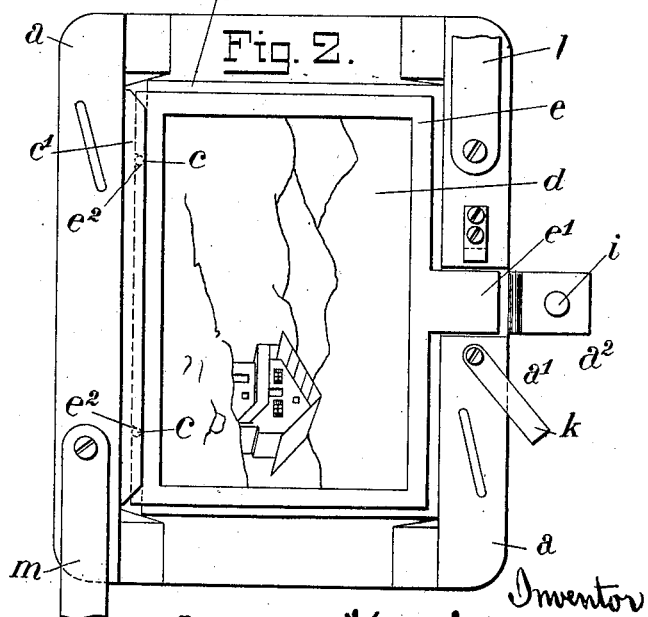

In Figs. 1 to 5, $a$ is a frame in which is placed a glass plate $b$. The frame $a$ is provided with two register catch-pins, made in this form of frame of two bars $c$, fixed into a metal piece $c'$ of a U-section. The negative $d$, from which a print is to be taken, is fixed to a frame $e$, (which may be made, for example, of stiff paper,) furnished with a projecting piece $e'$ and with register-notches $e^2$, which are destined to engage with the register catch-pins $c$ of the frame $a$, as is shown in Figs. 1 and 2. $f$ is a mask made of some translucent substance—such, for example, as celluloid—on the surface of which patches of color $f'$ can be applied, forming a shade or shades—for example, in the manner indicated by the shading-lines in Fig. 5. The said mask $f$ is fixed to a frame $g$, furnished with a projecting piece $g'$ and with register-notches $g^2$, which are destined to engage with the register catch-pins $c$ of the frame $a$. The drawing shows only one mask $f$; but several may be used, and they may be placed on the front or on the back of the negative, as occasion may require. The frame $a$ is provided with a groove or slot $a'$, intended to receive the projecting piece $e'$ of the frame carrying the negative and also the projecting piece $g'$ of the frame or of the frames of the masks. A movable piece $a^2$, provided with an elastic pad $i$ and with a fastening $k$, is joined to the frame $a$ by a hinge in such a manner as to firmly inclose the said projections $e'$ and $g'$ in the groove or slot $a'$. $h$ is the back of the frame. This back is not formed of several parts hinged together, as this is generally the case in usual printing-frames, but it is rigid. It carries a metallic band $h'$, provided with register-notches $h^2$, destined to engage with the register catch-pins $c$ of the frame $a$. The interior surface of the back $h$, Fig. 4, is covered with a sheet of india-rubber $p$, over which can be spread a suitable sticky material—for example, a thick solution of india-rubber. This is done in order that the back of the photographic print may adhere temporarily, but in such a manner that it can easily be removed. $l$ and $m$ are the ordinary springs used to press the back of the frame $h$ against the masks and negative. It is easy to understand that by the use of the system of registers described the operator can remove the back of the frame $h$ at any time during the printing of the proof. He can modify, change, or replace the mask $f$ or remove it altogether or put another in its place. He can then replace the back $h$ and continue the printing, the printing-paper having been returned to its position over the negative with a very great degree of accuracy. In the production of artistic photographs very great advantages will be found to result from this system, in the first place because the operator can see at any time the entire picture in course of production instead of seeing only a part of it, as is the case with printing-frames in ordinary use, and, in the second place, because by making suitable changes in the masks an almost unlimited amount of control may be given to the work in hand.

In the manner of carrying out the invention represented in Figs. 6 to 9 the frame $a$ is provided with three register-pins $n$, with which corresponding register-notches $e^2$ in the frame $e$, carrying the negative $d$, engage, as also the register-notches $g^2$ of the frame $g$, carrying the mask $f$, and the register-notches $h^2$ of the back $h$. This last is pressed against the masks and the negative by a spring $l'$, fixed to a bar $q$, which is hinged to the frame $a$ and provided with a fastening $r$. The system of registers of the frame $a$ and of the frames $e$ and $g$ can be varied indefinitely, as can also the means for fixing the paper during the printing—as, for instance, this latter may be done by drawing pins, clips, &c., to replace the sticky material mentioned above.

In the form of carrying out the invention shown in Fig. 10 the frame $e$ of the negative $d$, as also the back $h$, carrying the sticky surface $p$, are joined by hinges to the principal frame $a$. The frames $g$ of the masks $f$ can be in their turn united to the frame $e$ or to the back $h$ by hinges.

In the form of execution represented by Figs. 11 to 15 the frame $a$ is provided with two cylindric register-pins $n$, placed perpendicularly to the plane of the negative, and this latter carries a little plate $d'$, fastened to its border and provided with a V-shaped register-notch, or this latter may be on the frame carrying the negative, or it may be on the edge of a translucent plate of such a substance as celluloid supporting the negative and fixed to it. This V-shaped notch engages with one of the register-pins $n$, whereas the other register-pin serves simply to form a point of contact with the edge of the negative or of its support. A clip $a^3$ is placed on the border of the frame $a$ between the register-pins $n$, which serves to hold the negative $d$ and the mask or masks $f$ in their place when the back $h$ is removed for the inspection of the print. The V-formed notch being in this system applied to the cylindric pin $n$ determines two points of contact with great precision, and, moreover, these points of contact are very easily found without the least uncertainty or fumbling, whereas a third point of contact is formed between the border of the negative or its support and the other register-pin. It is easy to see that in this case the register is exceedingly exact and that it can be made with the greatest ease. The mask $f$ is in this case formed of a simple sheet of transparent celluloid on which one can apply patches of color to more or less mask certain parts of the negative. These sheets of celluloid are notched with the V-formed register, as is shown in Fig. 15. The back $h$ is covered on the interior with india-rubber sheeting $h'$, under which is placed a flat cushion of elastic material, such as felt $h^2$. The said back is also provided with a V-shaped register-notch $h^3$, destined to engage with one of the cylindric pins $n$, whereas the edge of the back simply rests against the other pin $n$. The back $h$ can, if thought advisable, be cut through and hinged in the old-fashioned manner, but in a direction parallel to the side which serves for the register; but in this case only the part adjacent to the register must be made sticky or adherent. The bars $q$ and their springs serve to press the back $h$ against the negative. The apparatus may be completed by the addition of one or more masks provided with register-notches, as shown above, and made of a sheet of translucent material of which the surface is tinted with a non-actinic color, as red or yellow or orange, but of such a consistency that the surface can be scratched away, so as in places to remove the non-actinic coloring-matter. In this manner effects of the type of etching can be produced. An effective colored mask for the above-mentioned use may be made by pouring colored collodion on a clean waxed glass plate. When the solvents of the collodion have evaporated, a film of gelatin is spread over the collodionized surface and suffered to dry. When dry, the double film of gelatin and collodin can be stripped from the plate. Anilin dyes should not be used for this purpose. Gamboge, saffron, and other vegetable dyes soluble in alcohol and ether are the more convenient. In dark tints coal-tar may be used. Another form of mask may also be used with this printing-frame, and that is a transparent positive taken from the negative to be printed from such transparent positive being mounted in a frame or other suitable support provided with register-notches to place it in exact register with the negative. By the use of such a positive mask the densest portions only of the negative may be first printed, and then on removing the mask and continuing the operation the more transparent parts of the negative can be printed in. In this manner soft prints can be made from hard negatives.

Having now fully described and shown the nature of my invention and how the same may be carried into effect, I claim—

1. In a photographic-printing frame, the combination with a frame of a back movable with respect thereto; and an adherent covering for the inner surface of said back, whereby the print is kept in its adjusted position when the back is moved with respect to the frame.

2. In combination in a photographic-printing frame, a frame provided with a plurality of registering-pins; and a back provided with elongated slots for engagement with said pins and the accurate positioning of said back thereby.

3. In combination in a photographic-printing frame, a frame provided with a plurality of registering-pins; and a negative-carrier provided with elongated slots for engagement with said pins and the accurate positioning of said carrier thereby.

4. In combination in a photographic-printing frame, a frame provided with a plurality of registering-pins; a negative-carrier slotted for engagement with said pins; and means for moving said carrier lengthwise of the slot to adjust said carrier.

5. In combination in a photographic-printing frame, a frame provided with a plurality of registering-pins; a negative-carrier slotted to engage said pins; means for moving said carrier lengthwise of the slots; and a securing device for said means.

6. In a photographic-printing frame, the combination of a frame provided with a plurality of registering-pins; a negative-carrier slotted to engage said pins; means for moving said carrier lengthwise of the slots; and a securing device for said means hinged to said frame.

7. In a photographic-printing frame, the combination of a frame with a plurality of registering-pins; and a mask provided with elongated slots to engage said pins for the accurate positioning of said mask.

8. In a photographic-printing frame, the combination of a frame provided with a plurality of registering-pins; a mask slotted to engage said pins; and means for moving said mask lengthwise of the slots for the accurate adjustment thereof.

9. In a photographic-printing frame, the combination of a frame provided with a plurality of registering-pins; a mask slotted to engage said pins; means for moving said mask lengthwise of the slots; and a device for securing said mask in its adjusted position.

10. In a photographic-printing frame, the combination of a frame provided with a plurality of registering-pins; and a holder slotted to engage said pins; said holder being provided with an adherent covering for keeping the print in its adjusted position when the back is removed from the frame.

11. In a photographic-printing frame, the combination of a frame provided with a plurality of registering-pins; a negative-carrier slotted to engage said pins; a mask slotted to engage said pins; and means for moving said mask and carrier relatively to each other.

12. In a photographic-printing frame, the combination of a frame provided with a plurality of registering-pins; a negative-carrier slotted to engage said pins; a mask slotted to engage said pins; means for moving said mask and carrier relatively to each other; and a device for securing said means.

13. In a photographic-printing frame, the combination of a frame; a negative-carrier; a holder adapted to receive a mask which is the positive of said negative; and means for adjusting said carrier and holder relatively to each other.

In testimony that I claim the foregoing as my invention I have signed my name in presence of two subscribing witnesses.

NELSON KING CHERRILL. [L. S.]

Witnesses:
B. HOWELL THOMAS,
T. KOENITZ.